US00RE50327E

(19) United States
(12) Reissued Patent
Iyengar

(10) Patent Number: US RE50,327 E
(45) Date of Reissued Patent: Mar. 4, 2025

(54) CAMERA CAPTURE FOR CONNECTED DEVICES

(71) Applicant: Adeia Media Holdings LLC, San Jose, CA (US)

(72) Inventor: Rahul Iyengar, Union City, CA (US)

(73) Assignee: Adeia Media Holdings LLC, San Jose, CA (US)

(21) Appl. No.: 17/372,241

(22) Filed: Jul. 9, 2021

Related U.S. Patent Documents

Reissue of:
(64) Patent No.: 10,348,951
Issued: Jul. 9, 2019
Appl. No.: 14/515,476
Filed: Oct. 15, 2014

(51) Int. Cl.

| | |
|---|---|
| ***H04N 7/14*** | (2006.01) |
| ***H04L 29/06*** | (2006.01) |
| ***H04L 29/08*** | (2006.01) |
| ***H04L 65/1089*** | (2022.01) |
| ***H04L 65/403*** | (2022.01) |
| ***H04L 67/10*** | (2022.01) |
| ***H04N 1/00*** | (2006.01) |
| ***H04N 5/232*** | (2006.01) |
| ***H04N 23/661*** | (2023.01) |

(52) U.S. Cl.
CPC ..... *H04N 1/00* (2013.01); *H04L 65/1089* (2013.01); *H04L 65/403* (2013.01); *H04L 67/10* (2013.01); *H04N 7/14* (2013.01); *H04N 7/142* (2013.01); *H04N 7/147* (2013.01); *H04N 23/661* (2023.01)

(58) Field of Classification Search
CPC H04N 7/142; H04N 1/00; H04N 7/14; H04N 7/147; H04N 5/23206; H04L 65/1089; H04L 67/10; H04L 65/403; H04L 65/1069; H04L 67/04; H04L 12/1822; H04L 67/54; H04L 65/4038; H04L 67/025; H04L 67/141; H04L 67/143; H04L 65/1104; H04L 67/303; H04L 65/1106; H04L 65/4053
See application file for complete search history.

(56) References Cited

U.S. PATENT DOCUMENTS

| | | | |
|---|---|---|---|
| 8,233,607 | B1 | 7/2012 | Ambrose |
| 8,537,740 | B2 | 9/2013 | Markel |
| 8,782,270 | B2 | 7/2014 | Sathianathan et al. |
| 9,043,474 | B2 | 5/2015 | Schleifer et al. |

(Continued)

OTHER PUBLICATIONS

"U.S. Appl. No. 14/506,515, Examiner Interview Summary mailed Jun. 1, 2017", 2 pages.

(Continued)

*Primary Examiner* — William H. Wood
(74) *Attorney, Agent, or Firm* — Haley Guiliano LLP

(57) ABSTRACT

Techniques and mechanisms described herein facilitate the capture and coordination of audio and/or video data across connected devices in a communications system. The communications system may include at least two media devices in communication via a network. One of the media devices may be a media application device configured to provide one or more media applications. Another of the media devices may be a media input device configured to capture video and/or audio data. Coordination between a media application and a media input device may be facilitated by a driver layer configured to communicate with the applications.

34 Claims, 4 Drawing Sheets

(56) References Cited

U.S. PATENT DOCUMENTS

| | | | | |
|---|---|---|---|---|
| 9,210,198 | B2 | 12/2015 | Efrati et al. | |
| 2004/0133641 | A1 | 7/2004 | McKinnon | |
| 2004/0247103 | A1 | 12/2004 | Tanimoto | |
| 2006/0010392 | A1* | 1/2006 | Noel | H04L 65/403 715/759 |
| 2008/0126549 | A1 | 5/2008 | Khanchandani | |
| 2008/0288633 | A1* | 11/2008 | Evans | G06F 3/1292 709/224 |
| 2008/0320082 | A1 | 12/2008 | Kuhlke | |
| 2009/0052351 | A1* | 2/2009 | James | H04L 12/1813 370/260 |
| 2010/0231556 | A1* | 9/2010 | Mines | G06F 3/0418 345/173 |
| 2011/0066745 | A1 | 3/2011 | Olsson | |
| 2011/0249079 | A1 | 10/2011 | Santamaria | |
| 2011/0314099 | A1 | 12/2011 | Imai | |
| 2012/0034938 | A1 | 2/2012 | Kreitzer | |
| 2012/0050455 | A1 | 3/2012 | Santamaria | |
| 2013/0040600 | A1* | 2/2013 | Reitnour | H04M 1/72424 455/418 |
| 2014/0012860 | A1* | 1/2014 | Kandur Raja | H04M 1/274583 707/748 |
| 2014/0068007 | A1* | 3/2014 | O'Gorman | H04N 7/147 709/219 |
| 2014/0229538 | A1* | 8/2014 | Ramachandran | G06F 17/30029 709/204 |
| 2015/0009865 | A1 | 1/2015 | Sharma | |
| 2016/0077710 | A1 | 3/2016 | Lewis | |
| 2016/0099980 | A1 | 4/2016 | Fernandes | |

OTHER PUBLICATIONS

"U.S. Appl. No. 14/506,515, Final Office Action mailed Feb. 10, 2017", 10 pages.

"U.S. Appl. No. 14/506,515, Final Office Action mailed Oct. 5, 2017", 12 pages.

"U.S. Appl. No. 14/506,515, Non Final Office Action mailed Jun. 16, 2017", 9 pages.

"U.S. Appl. No. 14/506,515, Non Final Office Action mailed Jun. 27, 2016", 8 pages.

"U.S. Appl. No. 14/506,515, Notice of Allowance mailed Jan. 19, 2018", 7 pages.

* cited by examiner

CAMERA CAPTURE FOR CONNECTED DEVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*RELATED U.S. APPLICATION DATA*

*This application is a reissue application of U.S. Pat. No. 10,348,951, which issued based upon U.S. patent application Ser. No. 14/515,476, which is hereby incorporated by reference herein in its entirety.*

TECHNICAL FIELD

The present disclosure relates generally to the detection, receipt, and coordination of audio and/or video input data, and more specifically to network-accessible cameras.

DESCRIPTION OF RELATED ART

In a media system, a local device communicates with one or more remote servers via a network to present media. For instance, a media system may present a video such as a movie or television show. Such a media system may be configured to employ local audio and/or video data to enhance the user's experience. For instance, a media system may receive local audio and/or video data to facilitate a teleconference with a remote device.

One participant in the teleconference may provide video and/or audio input data via a camera and/or microphone at a computing device. This video and/or audio input data may be transmitted via the network to the remote computing device where it is presented. The same procedure may be performed simultaneously in reverse. In this way, the participants in the teleconference may see and/or hear each other at their respective computing devices. Such teleconferences may be conducted via any of various devices. For instance, a participant to a teleconference may communicate via a personal computer, a laptop computer, or a mobile computing device such as a smart phone.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
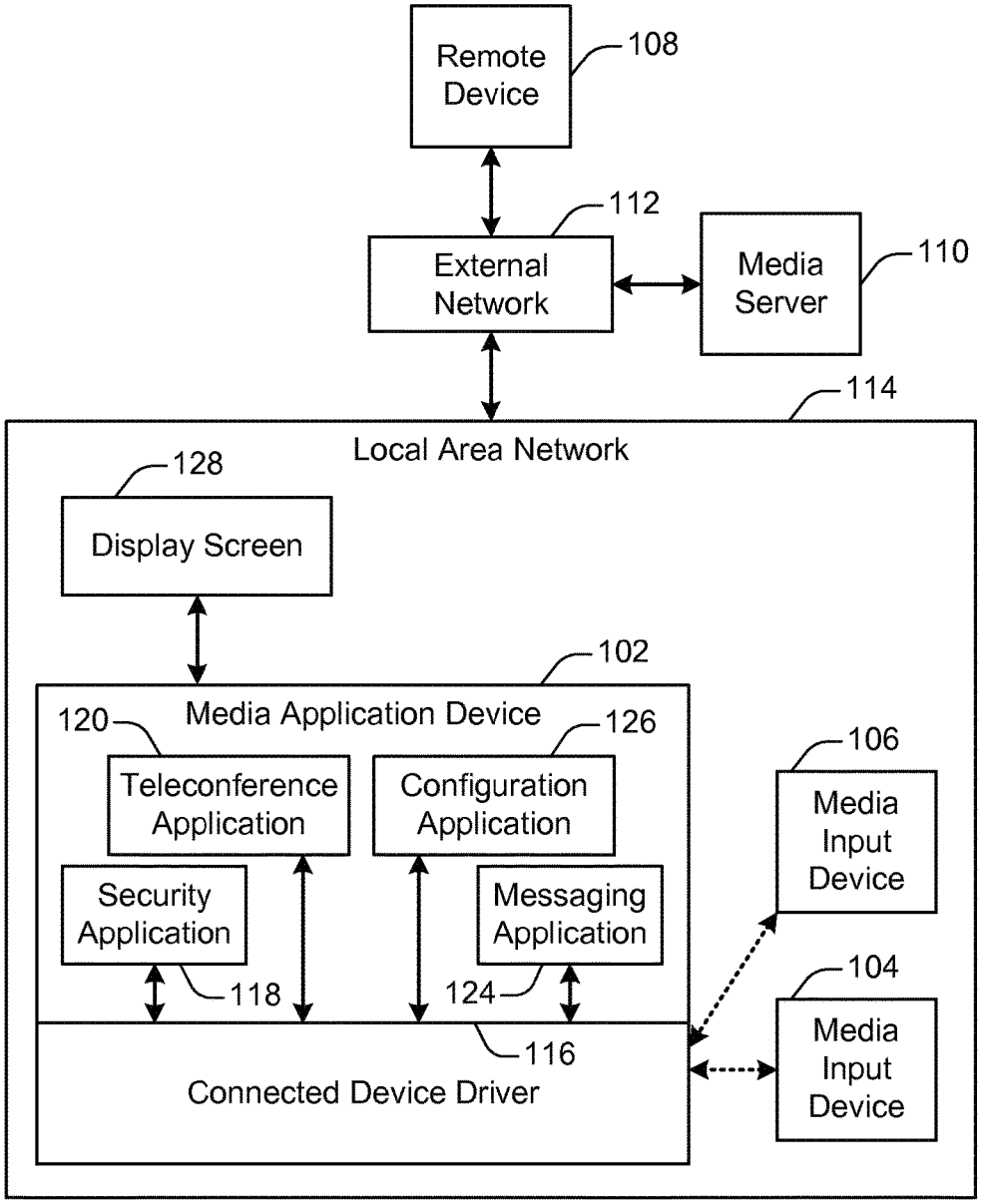
FIG. 1 illustrates an example of a system, configured in accordance with various techniques and mechanisms of the present invention.

Reference will now be made in detail to some specific examples of the invention including the best modes contemplated by the inventors for carrying out the invention.

Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular content streams, servers, and encoding mechanisms. However, it should be noted that the techniques of the present invention apply to a wide variety of different content streams, servers, and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein facilitate the capture and coordination of audio and/or video data across connected devices in a communications system. For instance, the audio and/or video data may be used to facilitate a teleconference between the communications system and a remote client device. The communications system may include at least two teleconference devices, such as a smart television and a smart phone. In particular embodiments, a teleconference device may be a television connected with a communications hardware component configured to provide additional communication capabilities. For instance, the communications hardware component may be an HDMI accessory such as a media streaming box or the MobiTV Connect available from MobiTV of Emeryville, Calif. Input data for the teleconference such as video and/or audio data may be received at one of the teleconference devices, such as the smart phone. Output data for the teleconference such as video and/or audio data received from the remote client device may be presented and a different one of the teleconference devices, such as the smart television. For instance, a user may conduct a teleconference in which a camera and microphone used to receive teleconference data is located on a smart phone, while the video and audio data received from another user is presented on a different device such as a television. Coordination between one or more applications on one device in the communications system and a network-accessible camera on a different device in the communications system may be facilitated by a driver layer configured to communicate with the applications.

Example Embodiments

In a video and/or audio teleconference, devices communicate via a network to present video and/or audio input data. The teleconference may allow two or more users to exchange unidirectional or bidirectional audio and/or video communications. In a conventional teleconference system, each end point of a teleconference is located at a single device. The device either includes a built-in video camera and/or microphone or connects directly to an external video camera and/or microphone.

According to various embodiments, techniques and mechanisms described herein support a teleconference in which output data received at an end point of a teleconference is presented at one computing device, while input data at the same end point is received at a different computing device. The two computing devices may each be standalone devices including such components as processors, memory, and communications interfaces.

In particular embodiments, a split screen video conference system may allow a user to conduct a teleconference via existing devices. For instance, the user may employ a dedicated display device such as a television to display the video conference data. The user may then employ a separate computing device such as a smart phone, laptop, or tablet that has a camera and/or microphone to provide video and/or audio data for the teleconference.

According to various embodiments, a communications interface may be communicably coupled with a device such as a television. However, the communications interface and the television may lack a microphone, camera, or both. In such a configuration, a user may initiate a video and/or audio teleconference on a different local device such as a mobile phone, tablet computer, or IP-connected camera that has a microphone and/or camera. This local device may be used to capture audio and/or video information for transmitting to a remote device. When the remote device that receives the incoming call responds, the audio and/or video information received from the local device may be presented on the television via the communications interface.

According to various embodiments, if a teleconference call is received at a system configured as described in the preceding paragraph, the incoming video and/or audio transmission received as part of the call may be transferred to the television. At the same time, the outgoing video and/or audio information transmitted to the remote device may be captured at the local device that is separate from the television.

In some implementations, a teleconferencing service may be implemented in conjunction with a content management service. The content management service may facilitate the interaction of users with various types of content. For instance, the content management service may provide a user interface for managing and accessing content from a number of different content sources. The interface may display content received via a cable or satellite television connection, one or more on-demand-video service providers such as Netflix or Amazon, and/or content accessible on local or network storage locations. In addition, the interface may be used to access this content on any number of content playback devices, such as televisions, laptop computers, tablet computers, personal computers, and mobile phones. At least some of the content may include live audio and/or video streams.

According to various embodiments, a media device may include one or more applications that employ a camera and/or microphone to capture video and/or audio information. Such applications use the captured information to facilitate interactivity that may include, but is not limited to: messaging, conferencing, and home security.

In particular embodiments, a media device on which applications are installed that employ captured video and/or audio information may or may not be equipped with a microphone and/or camera for capturing the information. For instance, the media device may be located on a network on which a different device such as a network-accessible camera may be used to capture audio and/or video information. The media device may be configured with a device driver that is operable to act as an interface between applications at the media device and other devices on the network.

According to various embodiments, the connected device driver may be configured to receive requests for audio and/or video data from an application on the media device and then route the request via a local network to media capture device capable of providing a response to the request. Also, the connected device driver may be configured to receive a response to the request from the media capture device and then provide the response to the application that transmitted the request.

FIG. 1 illustrates a system supporting communication via a network, performed in accordance with various techniques and mechanisms of the present invention. The system shown in FIG. 1 is configured to execute one or more media applications on a media application device 102. One or more of the media applications may employ media input data captured at an external media input device 106. In some instances, a media application may communicate with a remote computer, such as the remote device 108 or the media server 110.

According to various embodiments, the media application device 102 may be any device capable of executing one or more media applications and communicating via a network. For instance, the media application device 102 may be a smart phone, smart television, tablet computer, laptop computer, desktop computer, set top box, or a communications hardware component. A communications hardware component may be a device configured to provide communication capabilities to a different device. One example of such a device is the MobiTV Connect available from MobiTV of Emeryville, Calif. Such a device may communicate with the display screen 126 via a communications interface such as HDMI.

According to various embodiments, the media application device may include any of a variety of media applications. In FIG. 1, the media application device 102 includes a security application 118, a teleconference application 120, a configuration application 126, and a messaging application 124. However, a media application device may include any number of suitable media applications such as game applications, communication applications, and security applications.

According to various embodiments, the media application device 102 may include a connected device driver 116. The connected device driver 116 may be configured to facilitate interaction between a media application at the media application device and one or more external media input devices.

According to various embodiments, the connected device driver 116 may provide a standard interface for communication with media applications. For instance, the connected device driver 116 may appear to be a standard video camera from the perspective of the media application. When the media application needs to request captured media data such as video data, the media application then sends a request via a standard interface to the connected device driver 116.

According to various embodiments, the connected device driver 116 may communicate with one or more external media input devices, for instance via a network or an external port. For example, the connected device driver 116 may maintain a list of connected media input devices. The connected device driver 116 may also maintain configuration information indicating which connected media input device should be used to capture which type of media input data in which circumstances.

According to various embodiments, the connected device driver 116 may communicate with a connected media input device when requested by a media application. For instance, the connected device driver 116 may transmit a message to perform an operation such as initiating media input data capture, transmitting media input data to an application, and/or terminating media input data capture. When the connected media input device transmits captured media information back to the connected device driver 116, the connected device driver 116 may format or otherwise alter the received media information such that when the captured media information is presented to a media application, the media information appears to be coming directly from a local input device such as a camera.

According to various embodiments, the media application device may include a teleconference application 120 and/or a messaging application 124. Such applications may facilitate communication between a user of the media application device 102 and a user at a remote device such as the remote device 108. The communication may involve text, audio, video, or some combination thereof. For instance, the communication may involve a one-way or two-way audio and/or video teleconference.

According to various embodiments, the security application 118 may be configured to perform one or more of various security applications such as monitoring audio and/or video information, detecting intrusions, evaluating other types of threats, sounding alarms, and/or communicating with internal and/or external systems such as security services. For instance, the security application 118 may receive video input data from video cameras. Alternately, or additionally, the security application 118 may receive other types of input data captured at other types of devices. The security application may monitor the input data to determine whether an intrusion or other problem has occurred. If a problem is detected, the security application may transmit a message to another system, such as a remote server configured to provide security monitoring services.

According to various embodiments, the media application device 102 may include a configuration application 126. The configuration application may be operable to configure the connected device driver 116. For instance, the configuration application may be operable to perform operations such as designating a media input device to use for capturing media input data. Techniques for configuring a connected device driver via a configuration application are discussed in further detail with respect to FIG. 2.

According to various embodiments, the display screen 126 may be any device capable of presenting media output data such as video and audio. For instance, the display screen may be a television, a desktop computer monitor, a laptop computer monitor, a display screen on a mobile computing device such as a tablet or smart phone, or a projector display screen.

In particular embodiments, the display screen 126 may be located within the media application device 102. For instance, the media application device may be a mobile phone or smart television that includes a display screen.

In particular embodiments, the display screen 126 may be in communication with an external media application device. For instance, the media application device may be a communication hardware device configured to provide communication capabilities to a different device. One example of such a device is the MobiTV Connect available from MobiTV of Emeryville, Calif. Such a device may communicate with the display screen 126 via a communications interface such as HDMI.

According to various embodiments, a media input device may be any device capable of capturing media input data. For instance, the media input device may capture audio information, video information, presence information, or any other information capable of being used to communicate. Accordingly, the media input device may include a camera, a microphone, a gyroscope, a thermometer, another type of sensor, or any other device capable of capturing information from the environment.

In particular embodiments, a media input device may be configured to capture more than one kind of information. For instance, a media input device such as a camera may be configured to capture both audio and video information.

In particular embodiments, a system may include two or more media input devices. For instance, the system shown in FIG. 1 includes the media input device 104 and the media input device 106.

According to various embodiments, some media applications may communicate with other devices outside the LAN. For instance, teleconference or messaging applications may be used to communicate with other devices via the external network 112.

According to various embodiments, the external network 112 may be a WAN or any other suitable network for facilitating communication. For instance, the WAN may include the internet, a cellular communication network, or any other wide-ranging network capable of conducting communication between disparate devices.

According to various embodiments, the remote device 108 may be any network endpoint capable of conducting communications with the media application device 102. For instance, the remote device 108 may be a laptop computer, mobile phone, or other computing device capable of conducting a teleconference and/or messaging session with the media application device 102. A teleconference and/or messaging session between the remote device 108 and the media application device 102 may be initiated by either the remote device 108 or the media application device 102.

According to various embodiments, the media server 110 may be configured to perform any of various operations related to the media application device 102. For example, the media server 110 may be operable to provide content management servers. For instance, the media server 110 may be operable to transmit streaming video to the media application device 102 for presentation on the display screen 126.

As another example, the media server 110 may be operable to facilitate communications between the remote device 108 and the media application device 102. For instance, the media server 110 may be operable to perform operations such as validating a user's identity, establishing a communication session, terminating a communication session, or maintaining connection information describing how to communicate with different users and/or devices.

In particular embodiments, the remote device 108 and/or the media server 110 may be located on the LAN 114. For instance, an organization may implement a network that includes various media application devices, media input devices, and/or servers that may communicate with each other in various configurations.

Figure 2:
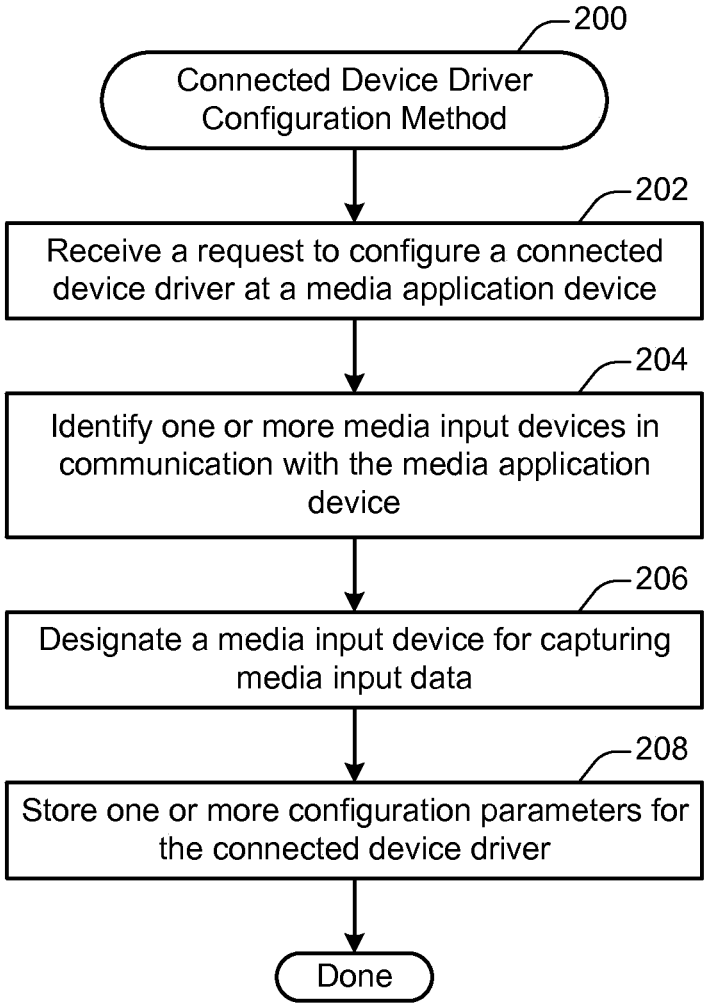
FIG. 2 illustrates an example of a method for configuring a connected device driver, performed in accordance with various techniques and mechanisms of the present invention.

FIG. 2 illustrates an example of a method 200 for configuring a connected device driver, performed in accordance with various techniques and mechanisms of the present invention. The method 200 may be performed at a media application device such as the device 102 shown in FIG. 1.

According to various embodiments, the method 200 may be performed in order to configure a connected device driver such as the connected device driver 116 shown in FIG. 2. Configuring the connected device driver may involve performing operations such as identifying one or more media input devices for capturing media input data. Alternately, or additionally, configuring the connected device driver may involve performing operations such as designating a media input device to use in particular situations.

At 202, a request to configure a connected device driver is received at a media application device. According to various embodiments, the request to configure a connected device driver may be generated manually or dynamically. For example, a user may provide user input requesting to configure a connected device driver. As another example, a request to configure a connected device driver may be generated periodically, for instance to update the connected device driver to account for system changes. As yet another example, a request to configure a connected device driver may be generated upon detection of a triggering event. Triggering events may include, but are not limited to: installing the connected device driver, updating the connected device driver, detecting the addition of media input device on the network, and detecting the addition of a media application on the media application device.

According to various embodiments, the request to configure the connected device driver may be generated at any of various devices and systems. For example, a media server such as the media server 110 may transmit a request to update the connected device driver. As another example, the request to update the connected device driver may be generated at the media application device 102. As yet another example, a media input device may trigger the generation of a request to configure the connected device driver, for instance when the media input device is connected to the network.

At 204, one or more media input devices in communication with the media application device are identified. According to various embodiments, various types of media input devices may be identified, as discussed with respect to the media input devices 104 and 106 shown in FIG. 1. A media input device may be identified by the media application device 102.

In particular embodiments, a media input device may be identified by scanning a network such as the LAN 114 for suitable devices. For instance, many devices may be configured to communicate via a network protocol by which a device identifies itself on the network. The information may be provided to a central point, such as a network router, which may then provide the information upon request to other devices, such as the media application device 102.

According to various embodiments, identifying a media input device may involve determining one or more media capture capabilities of the media input device. For instance, the media input device may provide information indicating whether the device is capable of capturing audio data, video data, other types of data, or some combination thereof.

At 206, a media input device for capturing media input data is designated. According to various embodiments, designating a media input device for capturing media input data may involve associating a media input device identified at operation 204 with one or more media capturing operations. For example, a network-accessible camera may be designated for capturing video data.

According to various embodiments, different devices may be designated to perform the same media input capturing task in different contexts. For example, one network-accessible camera may be linked with one media teleconference application, while another network-accessible camera may be linked with a different media teleconference application.

In particular embodiments, a media input device for capturing media input data may be designated at least in part automatically. For instance, the devices identified at operation 204 may include only one device suitable for performing a particular media capture task, such as capturing video data. In this case, the device may be automatically designated for performing the task.

In particular embodiments, a media input device for capturing media input data may be designated at least in part manually. For instance, the devices identified at operation 204 may include two or more devices suitable for performing a task. In this case, a user may be presented with a user interface allowing the user to select one of the devices for performing a particular task.

At 208, one or more configuration parameters for the connected device driver are stored. According to various embodiments, the configuration parameters may be stored in any way so long as the configuration parameters may be retrieved when necessary to facilitate communication between a media application and a media input device. For example, the configuration parameters may be stored on a storage medium at the media application device. As another example, the configuration parameters may be stored at a remote storage location such as the media server 110. As yet another example, the configuration parameters may be stored at a local storage location such as a network-accessible storage device located within the LAN 114.

According to various embodiments, various types of configuration parameters may be stored. For instance, each configuration parameter may identify one or more media capture tasks, one or more media input devices, one or more media applications, one or more contexts, and/or one or more user accounts. For example, a configuration parameter may indicate that a designated media input device should perform a designated media capture task in association with a designated media application in a designated context and for a designated user account. In some instances, different user accounts may be associated with different configuration parameters.

According to various embodiments, the operations shown in FIG. 2 may be performed more than once. For instance, different media input devices may be designated for performing different tasks.

Figure 3:
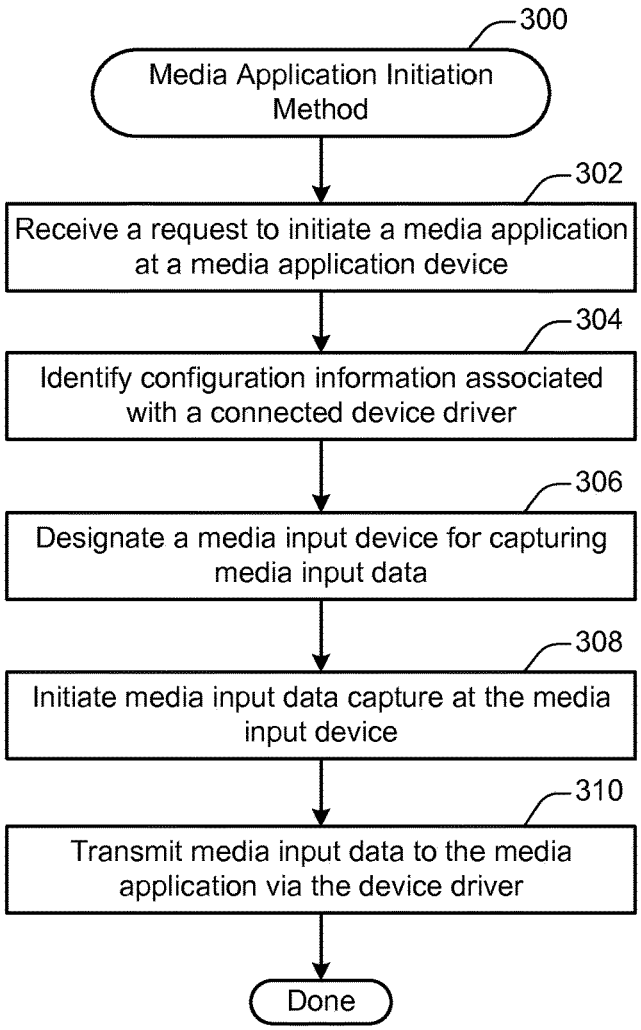
FIG. 3 illustrates a method for initiating a media application.

FIG. 3 illustrates a method 300 for initiating a media application. The method 300 may be performed at a media application device such as the device 102 shown in FIG. 1.

According to various embodiments, the method 300 may be performed in order to initiate a media application configured to employ media input data such as captured audio and/or video data. For instance, the media application may be a security application, a teleconference application, a messaging application, or any other application that employs such data.

At 302, a request is received to initiate a media application at a media application device. According to various embodiments, the request may be received from any of various sources. For example, a user at the media application device 102 may provide user input requesting to use the media application. As another example, an administrator at an external system such as the media server 110 may transmit a request to initiate an application. As yet another example, a remote device such as the remote device 108 may transmit a request to initiate teleconference or perform another such operation.

According to various embodiments, the request received at operation 302 may be generated at least in part manually. For instance, a user may select an application to initiate. Alternately, or additionally, the request received at operation 302 may be generated at least in part automatically. For instance, a request to initiate a teleconference received at the media application device 102 may trigger the initiation of a teleconference program configured to employ video and audio input data.

At 304, configuration information associated with a connected device driver is identified. According to various embodiments, the configuration information identified at operation 304 may overlap substantially with the configuration parameters stored at operation 208 discussed with respect to FIG. 2. For instance, the configuration information may designate one or more media capture tasks, one or more media input devices, one or more media applications, one or more contexts, and/or one or more user accounts. The configuration information may be identified by retrieving configuration parameters and any additional relevant information from a storage location, such as a network-accessible storage device, a remote storage device, or any storage medium accessible to the media application device.

At 306, a media input device for capturing media input device is designated. According to various embodiments, the media input device may be designated based on the configuration information identified at operation 304. For instance, the request received at operation 302 may identify information such as a type of media At 308, media input data capture is initiated at the media input device. According to various embodiments, initiating media input data capture may involve transmitting an instruction to begin the data capture from the connected device driver to the media input device. For instance, the instruction may be transmitted via the network. Then, the media input device may perform any operations necessary for initiating data capture at the device.

In particular embodiments, initiating media input data capture may involve establishing a communications session between the media input device and the connected device driver. For instance, a streaming session may be established where media data captured at the media input device may be streamed directly to the connected device driver.

At 310, media input data is transmitted to the media application via the connected device driver. According to various embodiments, transmitting the media input data to the media application may involve transmitting the media input data captured in operation 308 via the network to the connected device driver. The connected device driver may then transform the information into a format that is comprehensible to the media application. For instance, the connected device driver may transcode or otherwise process the data. Then, the connected device driver may provide the data to the media application via an accepted communication protocol for communicating with the media application.

According to various embodiments, the media application may effectively view the connected device driver as a local media input device. For instance, instead of communicating directly with a local camera to receive captured video data, the media application may communicate with the connected device driver. The connected device driver then receives the captured video data from a different device accessible via the network. However, the connected device driver may appear to be a local camera from the perspective of the media application.

Figure 4:
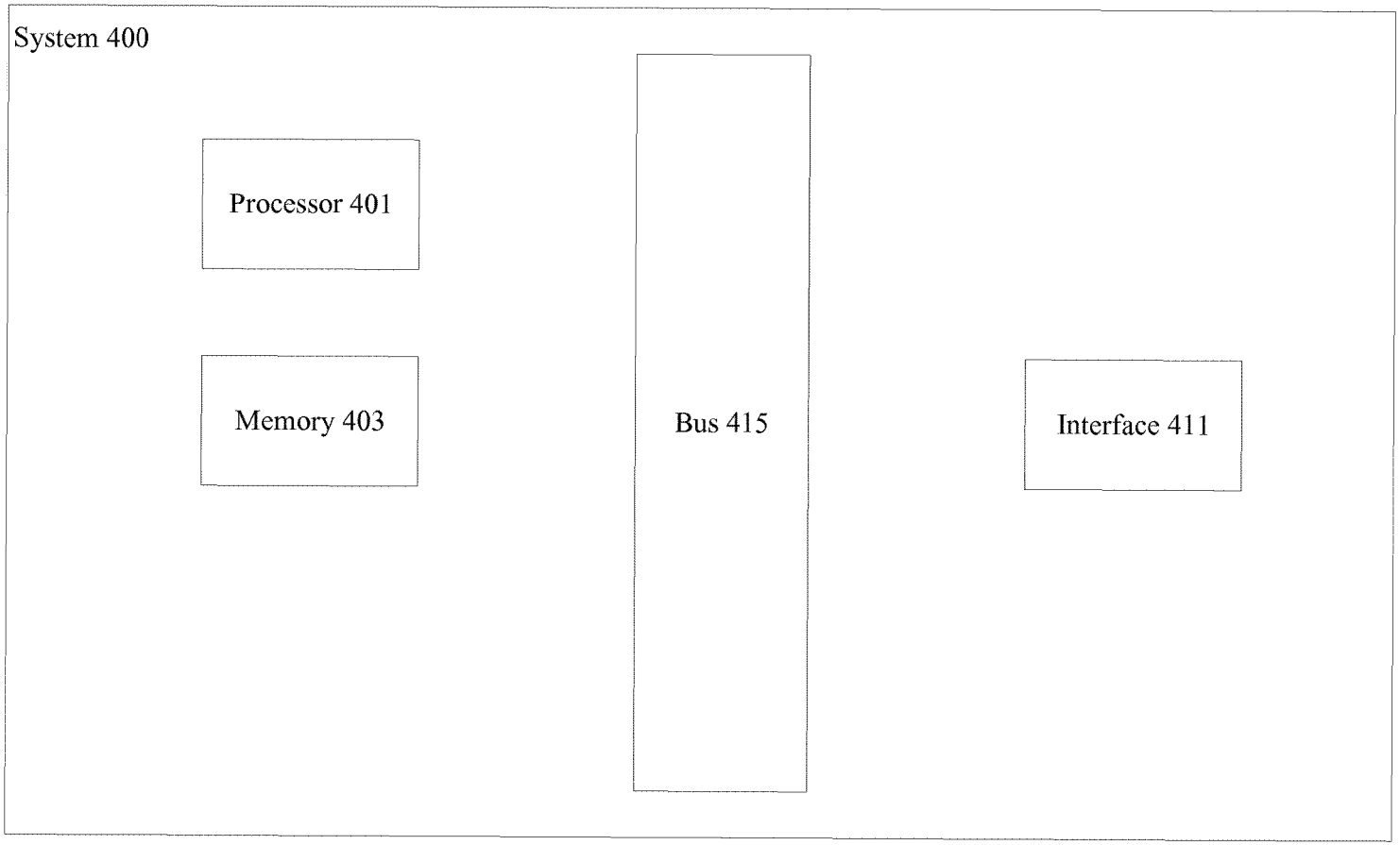
FIG. 4 illustrates an example of a system.

FIG. 4 illustrates one example of a computing device. According to particular embodiments, a system 400 suitable for implementing particular embodiments of the present invention includes a processor 401, a memory 403, an interface 411, and a bus 415 (e.g., a PCI bus or other interconnection fabric) and operates as a streaming server. When acting under the control of appropriate software or firmware, the processor 401 is responsible for facilitating a video and/or audio teleconference. Alternately, or additionally, the system 400 may be configured as a client device operable to receive and present media content items. Various specially configured devices can also be used in place of a processor 401 or in addition to processor 401. The interface 411 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A system comprising:

a local communications network;

a display screen;

a media input device connected to the local communications network via a first network endpoint and configured to capture media input data; and a media application device, separate from the media input device and not locally connected to the media input device, connected to the local communications network via a second network endpoint and including*:*

*a teleconference application, and* a connected device driver[, and a teleconference application,] *for the media input device, the connected device driver configured to:*

*maintain a list of connected media input devices;*

*maintain configuration information indicating which of the connected media input devices should be used to capture which type of media input data in which circumstances;*

*communicate with one of the media input devices that should be used to capture a type of media input data in a particular circumstance;*

*determine one of the media input devices to be used to capture the type of media input data in the particular circumstance;*

*receive captured media information from one of the media input devices determined to be used to capture the type of media input data in the particular circumstance; and*

*format the received media information such that when the captured media information is presented to the teleconference application, the media information appears to be coming directly from the one of the media input devices,* wherein the media application device is configured to communicate with the display screen via a high-definition multimedia interface (HDMI), wherein the media application device is configured to communicate with the media input device via the local communications network, wherein the connected device driver *for the media input device* is configured to mediate communications between the teleconference application and the media input device by receiving the media input data from the media input device via the local communications network and providing the media input data to the teleconference application, wherein the media application device views the *media input device connected via the* connected [driver] device *driver for the media input device* as a local media input device,

*wherein the media input device and the media application device are not locally connected to each other,*

*wherein the media input device is only connected to the media application device, sequentially, via the first network endpoint, the local communications network, and second network endpoint,*

*wherein the connected device driver processes data such that the media input device appears to the media application device exactly as data from a camera that is directly connected to the media application device via a cable,* wherein the teleconference application is configured to employ the media input data to facilitate a teleconference between the media application device and a remote computing device, wherein the teleconference application is configured to employ the display screen to present teleconference output data received from the remote computing device, wherein the media output data includes one or more of audio data or video data, wherein the media input data comprises video input data, and wherein the media application device includes a security application configured to monitor the video input data for security.

2. The system recited in claim 1, wherein the media input device includes a camera, and wherein the media input data includes video input data.

3. The system recited in claim 1, wherein the media input device includes a microphone, and wherein the media input data includes audio input data.

4. The system recited in claim 1, wherein the media application device includes a media application, and wherein the connected device driver is configured to mediate communications between the media application and the media input device, and wherein the media application is configured to employ the media input data.

5. The system recited in claim 4, wherein the media application is a messaging application configured to transmit and receive messages in communication with the remote computing device.

6. The system recited in claim 1, wherein the communications network comprises a local area network.

7. A method comprising:

at a media application device, receiving a request for media input data from a teleconference application;

designating a media input device, separate from the media application device and not locally connected to the media application device, configured to capture the media input data, the media input device being accessible via a local communications network via a first network endpoint;

providing the media input data to the teleconference application via a connected device driver *for the media input device* at the media application, *the connected device driver configured to:*

*maintain a list of connected media input devices;*

*maintain configuration information indicating which of the connected media input devices should be used to capture which type of media input data in which circumstances;*

*communicate with one of the media input devices that should be used to capture a type of media input data in a particular circumstance;*

*determine one of the media input devices to be used to capture the type of media input data in the particular circumstance;*

*receive captured media information from one of the media input devices determined to be used to capture the type of media input data in the particular circumstance;*

*format the received media information such that when the captured media information is presented to the teleconference application, the media information appears to be coming directly from the one of the media input devices; and*

[wherein the connected device driver is configured to] mediate communications between the teleconference application and the media input device by receiving the media input data from the media input device via the local communications network at a second network endpoint and providing the media input data to the first media application, wherein the media application device views the *media input device connected via the* connected [driver] device *driver for the media input device* as a local media input device,

*wherein the media input device and the media application device are not locally connected to each other;*

*wherein the media input device is only connected to the media application device, sequentially, via the first network endpoint, the local communications network, and second network endpoint,*

*wherein the connected device driver processes data such that the media input device appears to the media application device exactly as data from a camera that is directly connected to the media application device via a cable, and* wherein the teleconference application is configured to facilitate a teleconference between the media application device and a remote computing device; and presenting teleconference output data via a display screen in communication with the media application device via an HDMI interface, the teleconference output data including one or more of audio data or video data, wherein the media input data comprises video input data, and wherein the media application device includes a security application configured to monitor the video input data for security.

8. The method recited in claim 7, wherein the media input device includes a camera, and wherein the media input data includes video input data.

9. The method recited in claim 7, wherein the media input device includes a microphone, and wherein the media input data includes audio input data.

10. The method recited in claim 7, wherein the media application device includes a media application, and wherein the connected device driver is configured to mediate communications between the media application and the media input device, and wherein the media application is configured to employ the media input data.

11. The method recited in claim 10, wherein the media application is a messaging application configured to transmit and receive messages in communication with the remote computing device.

12. The method recited in claim 7, wherein the communications network comprises a local area network.

13. One or more non-transitory computer readable media having instructions stored thereon for performing a method, the method comprising:

at a media application device, receiving a request for media input data from a teleconference application;

designating a media input device, separate from the media application device and not locally connected to the media application device, configured to capture the media input data, the media input device being accessible via a local communications network via a first network endpoint;

providing the media input data to the teleconference application via a connected device driver *for the media input device* at the media application, *the connected device driver configured to:*

*maintain a list of connected media input devices;*

*maintain configuration information indicating which of the connected media input devices should be used to capture which type of media input data in which circumstances;*

*communicate with one of the media input devices that should be used to capture a type of media input data in a particular circumstance;*

*determine one of the media input devices to be used to capture the type of media input data in the particular circumstance;*

*receive captured media information from one of the media input devices determined to be used to capture the type of media input data in the particular circumstance;*

*format the received media information such that when the captured media information is presented to the teleconference application, the media information appears to be coming directly from the one of the media input devices; and*

[wherein the connected device driver is configured to] mediate communications between the teleconference application and the media input device by receiving the media input data from the media input device via the local communications network at a second network endpoint and providing the media input data to the first media application, wherein the media application device views the *media input device connected via the* connected [driver] device *driver for the media input device* as a local media input device,

*wherein the media input device and the media application device are not locally connected to each other,*

*wherein the media input device is only connected to the media application device, sequentially, via the first network endpoint, the local communications network, and second network endpoint,*

*wherein the connected device driver processes data such that the media input device appears to the media application device exactly as data from a camera that is directly connected to the media application device via a cable, and* wherein the teleconference application is configured to facilitate a teleconference between the media application device and a remote computing device; and presenting teleconference output data via a display screen in communication with the media application device via an HDMI interface, the teleconference output data including one or more of audio data or video data, wherein the media input data comprises video input data, and wherein the media application device includes a security application configured to monitor the video input data for security.

14. The one or more non-transitory computer readable media recited in claim 13, wherein the media input device includes a camera, and wherein the media input data includes video input data.

*15. A method comprising:*

*joining a media application device to a teleconference using a teleconferencing application, wherein the media application device is connected to a local network, and wherein the media application device comprises a connected device driver for a media input device, the connected device driver configured to:*

*maintain a list of connected media input devices;*

*maintain configuration information indicating which of the connected media input devices should be used to capture which type of media input data in which circumstances;*

*communicate with one of the media input devices that should be used to capture a type of media input data in a particular circumstance;*

*determine one of the media input devices to be used to capture the type of media input data in the particular circumstance;*

*receive captured media information from one of the media input devices determined to be used to capture the type of media input data in the particular circumstance; and*

*format the received media information such that when the captured media information is presented to the teleconference application, the media information appears to be coming directly from the one of the media input devices;*

*accessing, using the media application device via the local network, video data captured by the media input device, wherein the media application device is separate from the media input device and not locally connected to the media input device, and wherein the media input device is connected to the local network;*

*providing, using the media application device, the video data captured by the media input device to the teleconferencing application via the connected device driver for the media input device, wherein the media application device views the media input device connected via the connected device driver for the media input device as a local media input device, wherein the media input device and the media application device are not locally connected to each other, wherein the media input device is only connected to the media application device via the local communications network, and wherein the connected device driver processes data such that the media input device appears to the media application device exactly as data from a camera that is directly connected to the media application device via a cable; and*

*transmitting, using the media application device for display on a display device locally connected to the media application device the video data captured by the media input device.*

*16. The method of claim 15, wherein the media input device comprises a camera, and wherein the camera captures the video data.*

*17. The method of in claim 15, wherein the media input device further comprises a microphone, and wherein the media input device captures audio data.*

*18. The method of claim 15, wherein the connected device driver is configured to facilitate communications between the teleconferencing application and the media input device, and wherein the teleconferencing application is configured to employ the video data.*

*19. The method of claim 15, further comprising:*

*joining the media application device to the teleconference using a messaging application configured to transmit and receive messages in communication with the remote computing device.*

*20. The method of claim 15, wherein the media application device further comprises a security application configured to monitor the video data for security intrusions.*

*21. The method of claim 15, wherein the connected device driver is configured to:*

*receive requests for video data from the teleconferencing application on the media application device;*

*transmit the received request to the media input device via the local network;*

*capture video data by the media input device;*

*receive a response to the request of the video data captured from the media input device.*

*22. A system comprising:*

*a processing circuitry of a media application device connected to a local network and configured to:*

*join a teleconference using a teleconferencing application, wherein the media application device comprises a connected device driver for a media input device, the connected device driver configured to:*

*maintain a list of connected media input devices;*

*maintain configuration information indicating which of the connected media input devices should be used to capture which type of media input data in which circumstances;*

*communicate with one of the media input devices that should be used to capture a type of media input data in a particular circumstance;*

*determine one of the media input devices to be used to capture the type of media input data in the particular circumstance;*

*receive captured media information from one of the media input devices determined to be used to capture the type of media input data in the particular circumstance; and*

*format the received media information such that when the captured media information is presented to the teleconference application, the media information appears to be coming directly from the one of the media input devices;*

*access video data captured by the media input device, wherein the media application device is separate from the media input device and not locally connected to the media input device, and wherein the media input device is connected to the local network;*

*provide the video data captured by the media input device to the teleconferencing application via the connected device driver for the media input device, wherein the media application device views the media input device connected via the connected device driver for the media input device as a local media input device, wherein the media input device and the media application device are not locally connected to each other, wherein the media input device is only connected to the media application device via the local communications network, and wherein the connected device driver processes data such that the media input device appears to the media application device exactly as data from a camera that is directly connected to the media application device via a cable; and*

*the processing circuitry of the media application device configured to:*

*transmit the video data captured by the media input device for display on a display device locally connected to the media application device.*

*23. The system of claim 22, wherein the media input device comprises a camera, and wherein the camera captures the video data.*

*24. The system of claim 22, wherein the media input device further comprises a microphone, and wherein the media input device captures audio data.*

*25. The system of claim 22, wherein the connected device driver is configured to facilitate communications between the teleconferencing application and the media input device, and wherein the teleconferencing application is configured to employ the video data.*

*26. The system of claim 22, wherein the media application device is further configured to:*

*join the teleconference using a messaging application configured to transmit and receive messages in communication with the remote computing device.*

*27. The system of claim 22, wherein the media application device is further configured to:*

*monitor the video data using a security application for security intrusions.*

*28. The system of claim 22, wherein the connected device driver is configured to:*

*receive requests for video data from the teleconferencing application on the media application device;*

*transmit the received request to the media input device via the local network;*

*capture video data by the media input device;*

*receive a response to the request of the video data captured from the media input device.*

*29. A non-transitory computer-readable medium having non-transitory computer-readable instructions encoded thereon, when executed by control circuitry, cause the control circuitry to:*

*join a media application device to a teleconference using a teleconferencing application, wherein the media application device is connected to a local network, and wherein the media application device comprises a connected device driver for a media input device, the connected device driver configured to:*

*maintain a list of connected media input devices;*

*maintain configuration information indicating which of the connected media input devices should be used to capture which type of media input data in which circumstances;*

*communicate with one of the media input devices that should be used to capture a type of media input data in a particular circumstance;*

*determine one of the media input devices to be used to capture the type of media input data in the particular circumstance;*

*receive captured media information from one of the media input devices determined to be used to capture the type of media input data in the particular circumstance; and*

*format the received media information such that when the captured media information is presented to the teleconference application, the media information appears to be coming directly from the one of the media input devices;*

*access, using the media application device via the local network, video data captured by the media input device, wherein the media application device is separate from the media input device and not locally connected to the media input device, and wherein the media input device is connected to the local network;*

*provide, using the media application device, the video data captured by the media input device to the teleconferencing application via the connected device driver for the media input device, wherein the media application device views the media input device connected via the connected device driver for the media input device as a local media input device, wherein the media input device and the media application device are not locally connected to each other, wherein the media input device is only connected to the media application device via the local communications network, and wherein the connected device driver processes data such that the media input device appears to the media application device exactly as data from a camera that is directly connected to the media application device via a cable; and*

*transmit, using the media application device for display on a display device locally connected to the media application device the video data captured by the media input device.*

*30. The non-transitory computer-readable medium of claim 29, wherein the media input device comprises a camera, and wherein execution of the instructions further causes the control circuitry to capture video data with the camera.*

*31. The non-transitory computer-readable medium of claim 29, wherein the media input device further comprises a microphone, and wherein execution of the instructions further causes the control circuitry to capture audio data with the microphone.*

*32. The non-transitory computer-readable medium of claim 29, wherein the connected device driver is configured to facilitate communications between the teleconferencing application and the media input device, and wherein the teleconferencing application is configured to employ the video data.*

*33. The non-transitory computer-readable medium of claim 29, wherein execution of the instructions further causes the control circuitry to:*

*join the media application device to the teleconference using a messaging application configured to transmit and receive messages in communication with the remote computing device.*

*34. The non-transitory computer-readable medium of claim 29, wherein the media application device further comprises a security application configured to monitor the video data for security intrusions.*

* * * * *